Sept. 15, 1959   L. TAYLOR ET AL   2,903,732
WIPER DE-ICER
Filed July 16, 1956
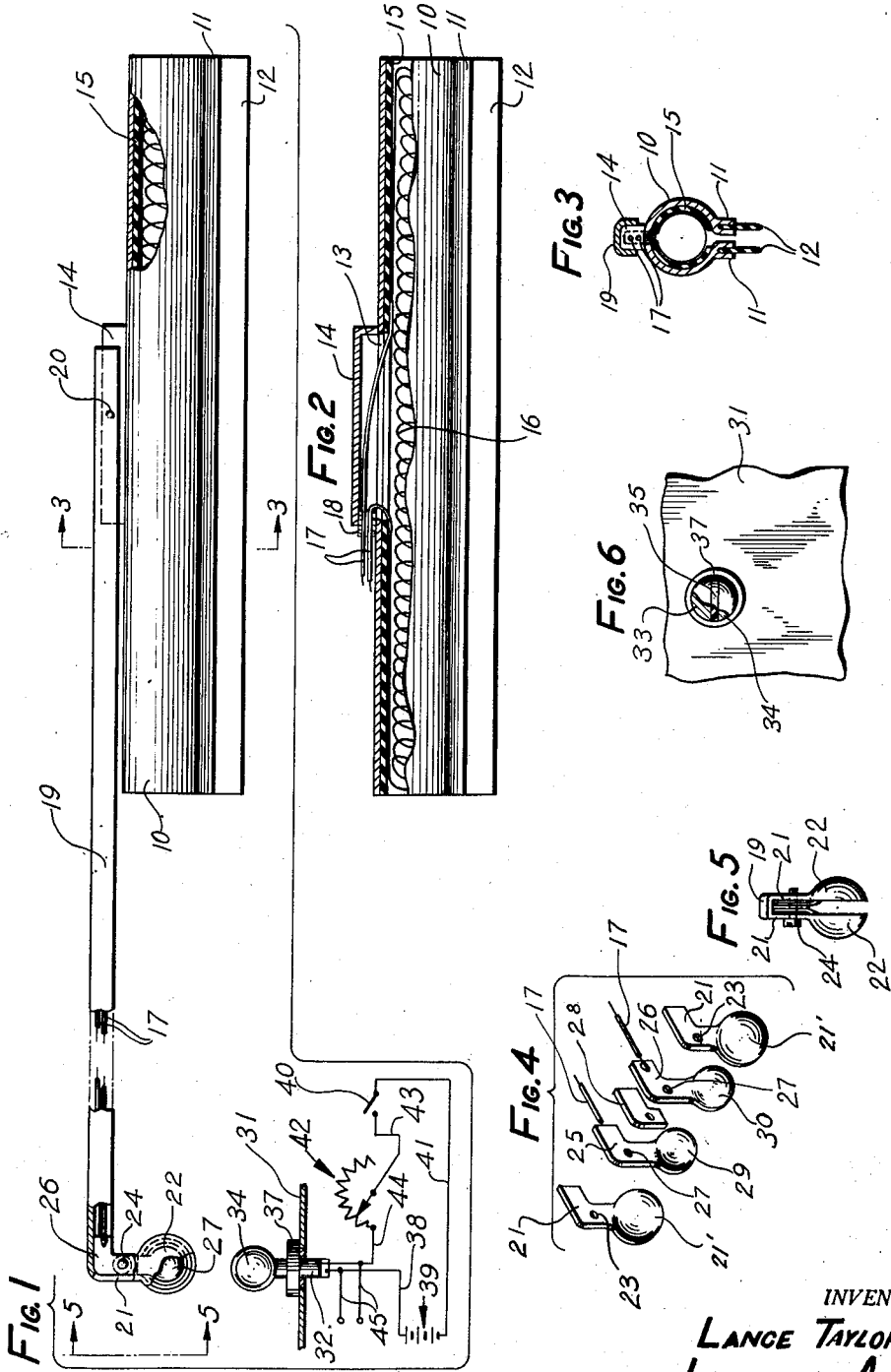
INVENTORS.
LANCE TAYLOR
LAWRENCE A. SIMS

United States Patent Office 2,903,732
Patented Sept. 15, 1959

2,903,732

WIPER DE-ICER

Lance Taylor and Lawrence A. Sims, Salmo, British Columbia, Canada

Application July 16, 1956, Serial No. 598,118

1 Claim. (Cl. 15—250.5)

This invention relates to windshield wiper de-icing equipment.

It is an object of the present invention to provide a windshield wiper de-icer which is controlled from the dashboard of the car to prevent ice from forming on the windshield.

Conventional windshield wipers have long been dangerous in countries where temperatures reach below freezing, which is the greater part of the world. This condition, is particularly hazardous and annoying to truckers and bus drivers.

It is accordingly another object of the present invention to provide a wiper de-icer which will overcome the above harzards.

Other objects of the invention are to provide a wiper de-icer bearing the above objects in mind which is of simple construction, has a minimum number of parts, is inexpensive to manufacture and efficient in use.

For other objects and for a better understanding of the invention, reference may be had to the following detailed description taken in connection with the accompanying drawing, in which:

Figure 1 is a diagrammatic view of a preferred embodiment of the present invention;

Fig. 2 is a side view shown partly in elevation and partly in section of the wiper and electrical heating section;

Fig. 3 is a transverse sectional view taken along the line 3—3 of Fig. 1;

Fig. 4 is an exploded perspective view of the contacts and joint assembly forming another part of the invention;

Fig. 5 is an end elevational view looking along the line 5—5 of Fig. 1; and

Fig. 6 is a top plan view of the ball joint shown partly in section and forming another part of the invention.

Referring now more in detail to the drawing, 10 represents a hollow cylindrical wiper body split along one side and integrally formed with the laterally spaced lips 11 within which are mounted the rubber wiper blades 12, substantially as illustrated.

The body 10 at the center thereof at the side remote from the lips 11 is provided with an elongated slot 13 across which is secured a closed rectangular housing 14, the interior of which communicates with the interior of the body.

An insulator sleeve 15 is positioned within the body member 10 and is split along one side adjacent the blades 12, the sleeve 15 also being split on the other side so as to communicate with the interior of the housing 14.

An electric heating element 16 is positioned within the sleeve 15 extending substantially the length thereof and has the insulated end portions 17 which pass outwardly through the slot 13 into the housing 14 and through a plug 18 provided at the rear of the housing (Fig. 2).

An elongated wiper arm 19 of U-shaped cross section fits downwardly onto the housing 14 at one end and is pivotally connected thereto by means of a removable pin 20. The other end of the arm 19 is formed with a pair of hemispherical hollow portions 22 having their concave surfaces facing inwardly, and a pair of L-shaped plates 21 of electrical non-conductive material formed at their lower ends with hollow hemispherical portions 21' carried within said hemispherical portions 22. The plates 21 are provided with the laterally aligned openings 23 through which are screw threaded a set screw 24 for drawing the members 21 together.

A pair of L-shaped conductors 25 and 26 are mounted on the set screw 24 intermediate the L-shaped portions 21 by means of the openings 27, an L-shaped insulator strip 28 being mounted on the set screw intermediate the conductors 25 and 26. The lower ends of the conductors 25 and 26 are integrally formed with the hollow hemispherical contacts 29 and 30, respectively. The insulated conductors 17 at their other ends remote from the heating coil are connected to the contacts 26 and 25 (Fig. 4).

The dashboard 31 is provided with a split drive shaft 32 having a central insulator portion and formed of electrically conductive material, on the upper end of which is fixedly mounted the ball made up of the hemispherical halves 33 and 34 separated by the insulator layer 35 (Fig. 6), a collar 37 being keyed to the shaft 32 below the ball. One-half of the shaft 32 is connected to the hemispherical half 33 at one end and to the conductor 38 at the other end which is in turn connuected to the storage battery indicated generally at 39. The other terminal of the storage battery is connected to one terminal of the switch 40 by means of the conductor 41, the other terminal of the switch 40 being connected to one terminal of the rheostat indicated generally at 42 by means of the conductor 43. The other terminal of the rheostat 42 is connected to the other half of the shaft (i.e. the hemispherical half 34) by means of the conductor 44. A pair of parallel conductors 45 are connected to the conductors 38 and 44 for similar connection to the alternate or other drive. The set screw 24 will permit the tightening of the contacts 29 and 30 onto the ball drive, as will be obvious.

The conventional means will be employed for driving the shaft 32 which will now be provided with the ball 33, 34, 35 for driving the wiper blades. It will be noted that the assembly thus described will permit the movement of the wiper without twisting the wires 44 and 38. The means for driving the shaft 32 will be the conventional type, employed in automobiles and need not here be described in detail. The switch 40 and variable rheostat 42 mounted on the dashboard of the car will control the power or heat from the coil 16. During the operation of the wiper, the heating element 16 will prevent ice from forming on the windshield and the reduction of visibility thereby. The invention will be particularly useful to truckers and motorists as well as aircraft and will prevent many accidents which are caused by poor visibility.

While various changes may be made in the detail construction, it shall be understood that such changes shall be within the spirit and scope of the present invention as defined by the appended claim.

What we claim as new and desire to protect by Letters Patent of the United States is:

A wiper de-icer comprising, in combination, a wiper arm, a hollow elongated wiper body connected to one end of said wiper arm, electric heating elements positioned within said hollow body and conductors for supplying said electrical heating elements extending through said wiper arm, a pair of hemispherical hollow portions on the other end of the arm having their concave surfaces facing inwardly, a pair of L-shaped plates of electrically non-conductive material terminating at their lower ends in hollow, hemispherical portions carried within said hemispherical portions on said arm, screw means carried by said wiper arm piercing said L-shaped plates whereby to draw the hemispherical hollow portions together upon tightening said screw means, a pair of L-shaped contact plates positioned intermediate said first plates on said screw means, each of said contact plates being connected to one of the conductors extending through said arm, an insulative plate on said screw means intermediate said contact plates, each of said contact plates at its lower end being integrally formed with a hollow hemispherical contact, a drive shaft mounted upon the dashboard of the vehicle with means for effecting rotation thereof, said drive shaft being split and having a central insulator plate, the opposite sides of said shaft being formed of electrically conductive material, the upper end of each of the shaft halves being integrally formed with a hemispherical enlargement forming a unitary ball, said insulator plate separating said enlargements, and said hemispherical contacts being positioned on opposite sides of said ball.

References Cited in the file of this patent

UNITED STATES PATENTS

| | | |
|---|---|---|
| 1,649,848 | Nixon | Nov. 22, 1927 |
| 2,100,019 | Wilson | Nov. 23, 1937 |
| 2,755,499 | Mays | July 24, 1956 |